(12) United States Patent
Barkley, Jr.

(10) Patent No.: US 9,379,580 B2
(45) Date of Patent: Jun. 28, 2016

(54) UNINTERRUPTABLE POWER SUPPLY

(71) Applicant: Metropolitan Industries, Romeoville, IL (US)

(72) Inventor: Wayne Joseph Barkley, Jr., Brookfield, IL (US)

(73) Assignee: METROPOLITAN INDUSTRIES, Romeoville, IL (US)

( * ) Notice: Subject to any disclaimer, the term of this patent is extended or adjusted under 35 U.S.C. 154(b) by 143 days.

(21) Appl. No.: 14/264,790

(22) Filed: Apr. 29, 2014

(65) Prior Publication Data

US 2015/0311817 A1 Oct. 29, 2015

(51) Int. Cl.
| | |
|---|---|
| *H02J 9/06* | (2006.01) |
| *H02M 7/49* | (2007.01) |
| *H02M 7/5387* | (2007.01) |
| *H02M 1/00* | (2006.01) |

(52) U.S. Cl.
CPC ............... *H02J 9/062* (2013.01); *H02M 7/49* (2013.01); *H02M 7/5387* (2013.01); *H02M 2001/0077* (2013.01)

(58) Field of Classification Search
CPC ......... H02J 9/062; H02J 1/102; H02J 7/0068; H02J 7/0073; H02J 7/34; H02M 3/137; H02M 3/285; H02M 5/458; H02M 7/537; H02M 7/53873; H02M 7/797
See application file for complete search history.

(56) References Cited

U.S. PATENT DOCUMENTS

| | | | |
|---|---|---|---|
| 5,508,905 A * | 4/1996 | Reichard ................. | H02M 7/49 307/58 |
| 6,198,257 B1 | 3/2001 | Belehradek et al. | |
| 6,847,130 B1 | 1/2005 | Belehradek et al. | |
| 2009/0230909 A1 * | 9/2009 | Hiti ..................... | H02P 21/0003 318/564 |

\* cited by examiner

*Primary Examiner* — Adolph Berhane
*Assistant Examiner* — Henry Lee, III
(74) *Attorney, Agent, or Firm* — Husch Blackwell LLP

(57) ABSTRACT

An apparatus including a plurality of transformers each having a primary winding and a secondary winding where the secondary windings are connected in series, a battery, a plurality of switches, each coupled to one of the plurality of transformers, the switches intermittently closes to complete a circuit between the battery and the primary winding of the one transformer and a processor that individually activates the respective switches of the plurality of transformers in a predetermined order to generate an alternating current voltage across an output of the series connected secondary windings.

20 Claims, 2 Drawing Sheets

UNINTERRUPTABLE POWER SUPPLY

FIELD

The field relates to power supplies and more particularly to battery based alternating current power supplies.

BACKGROUND

Systems are known to provide power in the event of failure of a power grid. Such systems may have operational characteristics based upon the equipment powered and/or upon any of a number of other support requirements. For example, where short periods of power outage may be tolerated, then a gasoline or diesel powered generator or alternator may be activated following the power failure.

Other systems may rely upon the use of one or more batteries to provide power. This may be a useful alternative where an internal combustion engine cannot be used because of safety concerns or because of space limitations.

However, a battery may provide a power output at a single direct current voltage while the load may require an alternating current voltage. This may require the use of a power converter that converts the direct current of the battery to the alternating current of the load.

In order to facilitate the powering of equipment from a battery, a number of different power converters may be used. For example, some backup systems have used direct current (dc) motors powered directly from the battery to mechanically drive an alternating current (ac) generator that is, in turn, used to provide ac power to the computer system. Other systems have relied upon the use of solid state inverters to convert the dc power of the battery to the ac power required by some types of computer equipment.

An inverter may include one or more switches that interrupt the battery voltage at a predetermined frequency (e.g., 60 Hz). The result is a waveform that roughly approximates the sine wave of ac power normally received from the power grid.

While inverters work relatively well, it is sometimes difficult to match the load to the switching capabilities of the inverter. Accordingly, a need exists for better methods of generating ac during power failures.

DETAILED DESCRIPTION

Figure 1:
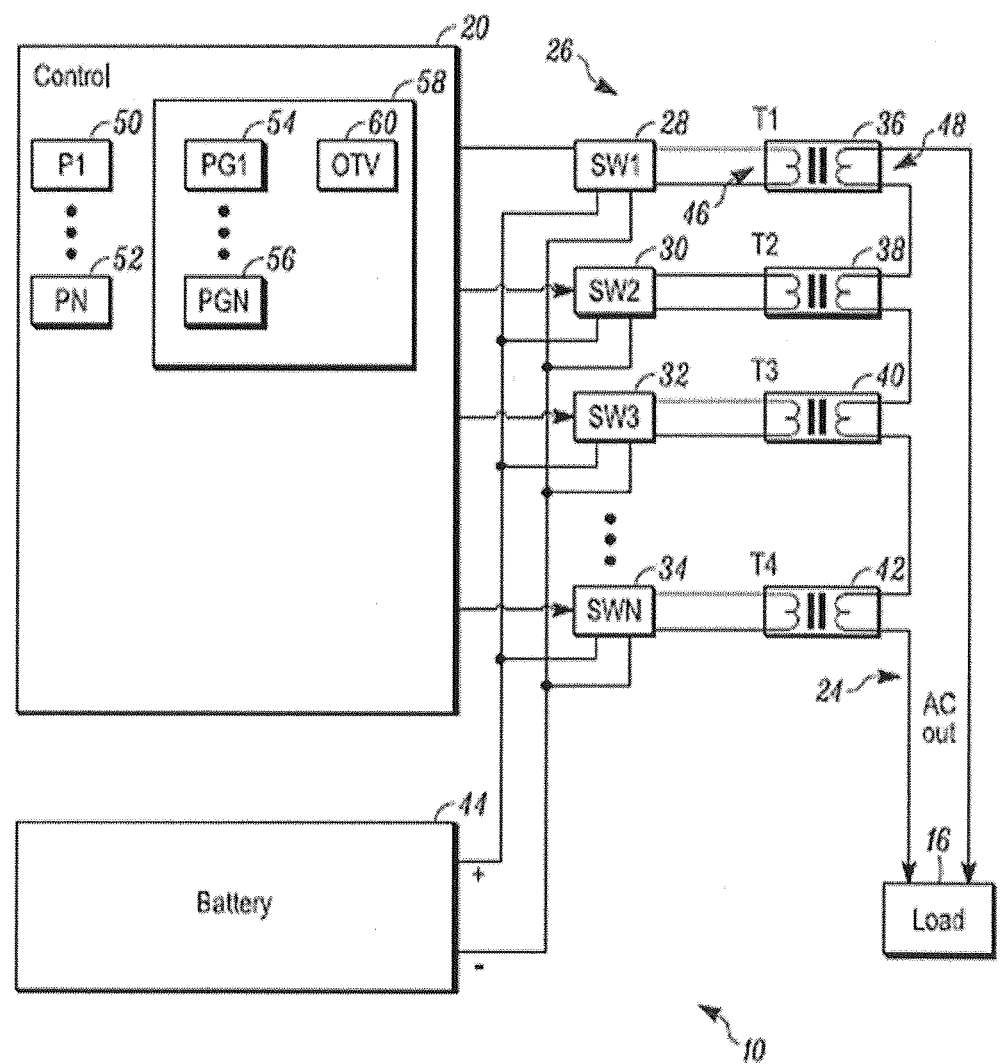
FIG. 1 illustrates a power supply in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 depicts a power supply 10 shown generally in accordance with an illustrated embodiment. Included within the power supply is a controller 20 coupled to an inverter 26. The inverter supplies ac power through an ac output 24 of the inverter to a load 16.

Included within the inverter is a number of switching devices (switches) 28, 30, 32, 34 and a corresponding number of transformers 36, 38, 40, 42. While four switches and four transformers are shown in FIG. 1, it should be noted that any number of corresponding switches and transformers may also be used. A primary winding 46 of each of the transformers is connected to a respective switch. The secondary windings 48 of each of the transformers are connected in series and together provide an ac output voltage across the ac output of the inverter.

Each of the switches is directly coupled between a battery 44 and a respective transformer. The controller sequentially activates each of the switches in a way that generates ac power across the output connection of the inverter.

Figure 2:
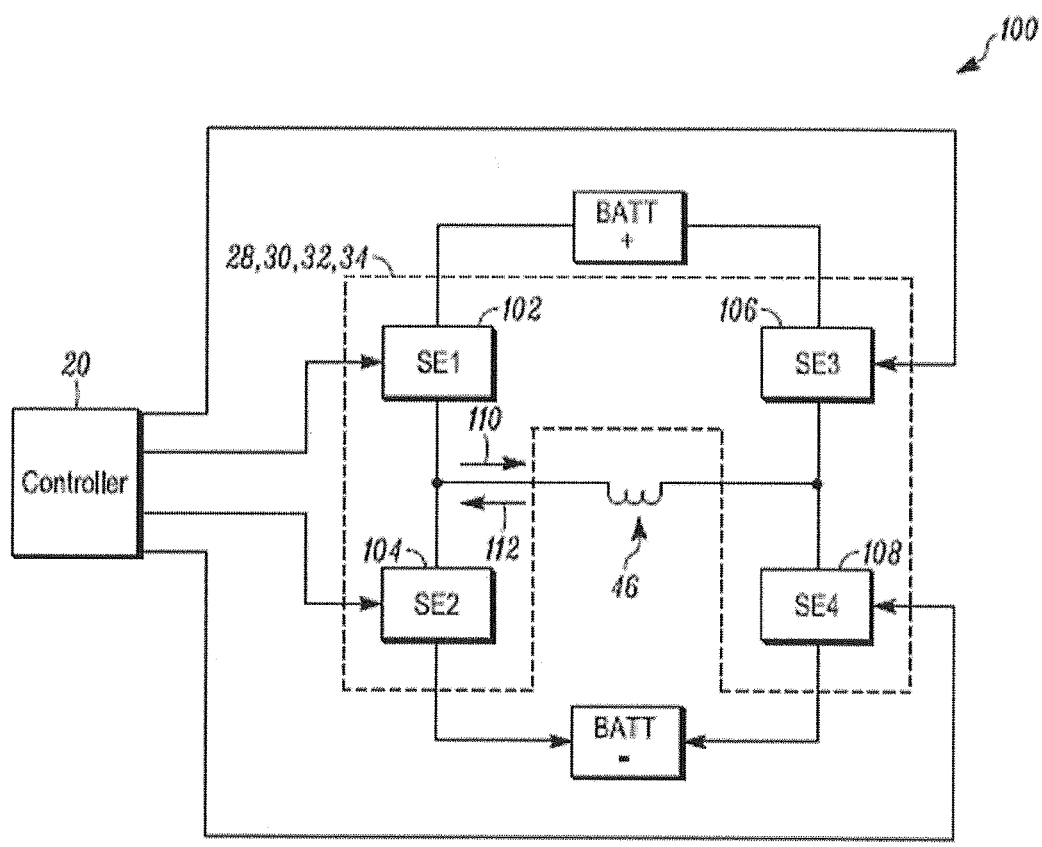
FIG. 2 illustrates details of the switches of FIG. 1.

FIG. 2 is a more detailed diagram 100 of the controller and each of the switches including detailed control connections between the controller and each of the switches. As shown, each of the switches includes four switching elements 102, 104, 106, 108 that are individually activated by the controller. In this regard, activation of a first set of switching elements 102, 108 causes current to flow through the primary winding 46 in a first direction 110 and activation of a second set of switching elements 106, 104 causes current to flow through the primary winding 46 in a second direction 112.

Included within the controller is a number of processor apparatus (processors) 50, 52. Each of the processors operates under control of one or more computer programs 54, 56 loaded from a non-transitory computer readable medium (memory) 58. As used herein, reference to a step performed by a computer program is also reference to the processor that executed that step.

Under the illustrated embodiment, the ac output is provided at some predetermined frequency (e.g., 50 Hz, 60 Hz, etc). At the predetermined frequency, the output voltage of the inverter completes a number of voltage cycles equal to the frequency. For example, at 60 Hz, the output voltage completes 60 cycles in one second. Each cycle, in turn, may be divided into 360 electrical degrees for purposes of defining an activation time and deactivation time of the switches in terms of electrical degrees.

During one cycle, the output voltage of the inverter reaches a maximum voltage at 90 electrical degrees after the start of the cycle, zero volts at 180 electrical degrees, a negative maximum at minus 270 electrical degrees and zero volts at 360 electrical degrees.

A time offset of the start times (activation time) of each switch may be determined by dividing 90 degrees by the number of switches present within the inverter. For example, if the inverter includes four switches, then the offset of start time may be 22½ electrical degrees. The offset start times may be saved in an offset timing file 60.

A start offset may also be determined from the switch time offset. The start offset may be a value that the first switch is offset from 0 electrical degrees and in the example above would be 11¼ electrical degrees.

As a more specific example, a first switch (e.g., 28 may be activated at 11¼ electrical degrees), a second switch may be activated at 33¾ electrical degrees, a third switch may be activated at 56¼ electrical degrees and a fourth switch may be activated at 78¼ electrical degrees. Similarly, the fourth switch may be deactivated at 101¼ electrical degrees, the third switch may be deactivated at 123¾ electrical degrees, the second switch may be deactivated at 146¼ electrical degrees and the first switch may be deactivated at 168¾ electrical degrees.

Between 0 and 180 electrical degrees, the switches may be activated so that current flows in the forward direction 110 through the primary transformer and provides a positive voltage for a first one-half of the sine wave provided at the output 24. Between 180 and 360 degrees, the switches are activated so that current flows in the reverse direction 112 through the primary transformers and produces a negative one-half of the sine wave at the output 24.

In operation, the activation points (e.g., 11¼ degrees, 33¾ degrees, 56¼ degrees, 78¾ degrees and deactivation points 101¼ degrees, 123¾ degrees, 146¼ degrees, 168¾ electrical degrees, etc.) may be save as threshold values for each of corresponding switches. A timing processor may step through the 360 electrical degrees of one cycle activating and deactivating each switch as the stepped value of the timing processor exceeds each threshold.

In effect, the threshold values define a set of operational slots for the transformers. The first slot begins at 11¼ electrical degrees and ends at 168¾ degrees, the second slot begins at 33¾ degrees and ends at 146¼ degrees, the third slot begins at 56¼ degrees and ends at 123¾ degrees and the fourth slot begins at 78¾ degrees and ends at 101¼ degrees.

In addition to activating and deactivating each switch, a precessing processor may precess the respective switches and corresponding transformers among operational slots in order to average a work load on each switch and transformer and to reduce overall heating. For example, during a first 180 electrical degrees, a first switch and transformer may be assigned to a first slot, a second switch and transformer may be assigned to the second operational slot, a third switch and transformer may be assigned to the third operational slot and a fourth switch and transformer may be assigned to the fourth operational slot. During the second half of the cycle (i.e., from 180 to 360) electrical degrees, the first switch and transformer may be assigned to the second operational slot, the second switch and transformer may be assigned to the third operational slot, the third switch and transformer may be assigned to the fourth operational slot and the fourth switch and transformer may be assigned to the first operational slot. This precession of assignments may be shown in the timing diagram as follows.

| LAG | LEAD | $4^{th}$ | $3^{rd}$ | Start Position |
|---|---|---|---|---|
| T1 | T2 | T3 | T4 | |
| LEAD | $4^{th}$ | $3^{rd}$ | LAG | First iteration |
| T1 | T2 | T3 | T4 | |
| $4^{th}$ | $3^{rd}$ | LAG | LEAD | Second iteration |
| T1 | T2 | T3 | T4 | |
| $3^{rd}$ | LAG | LEAD | $4^{th}$ | Third iteration |
| T1 | T2 | T3 | T4 | |
| LAG | LEAD | $4^{th}$ | $3^{rd}$ | Fourth iteration |
| T1 | T2 | T3 | T4 | (Start position) |

In this diagram, the terms LAG, LEAD, $4^{th}$ and $3^{rd}$ identify operational slots. The terms T1, T2, T3 and T4 each refer to a switch and the corresponding transformer.

In general, the inverter uses H-bridge architecture to control four voltage transformers in order to produce ac voltage from a dc source. The sequence of firing the switch elements (e.g., MOSFETs) involved in the H-bridge circuitry controls the shape, frequency, voltage and other characteristics typical of ac signals. The inverter and controller produce a modified ac sine wave signal in as result of converting dc battery voltage to ac voltage. The sequence, and manipulation thereof, of the MOSFETs, is controlled by the software running inside a microcontroller. The controller's code is unique in the way it handles the control of the MOSFETs in order to "rotate" which transformers are responsible for making or otherwise contributing to their respective portion of the modified sine wave. The basic concept of the transformer rotation involves assigning positional order of each of the 4 transformers included in the inverter. For example, LEAD is the first transformer used to make the first step of the sine wave, LAG is the second transformer used to make the second step of the sine wave, $3^{rd}$ is the third transformer used to make the third step of the sine wave and $4^{th}$ is the fourth transformer used to make the fourth step of the sine wave.

The software manipulates the positioning of the transformers in order to share the load and to decrease the rate and reduce the amount of overall thermal buildup. The manipulation of transformer position can be controlled in any possible order for any given number of transformers involved in the sine wave creation.

The time between iterations (advancing switches and transformers among slots) is controlled by software and can be manipulated to control the load sharing effect. The control of the position within which transformers are used can also be completely customized in order to produce a desired load sharing effect. Transformer rotation can be triggered periodically, instantly upon some internal/external event, or by any means the controlling software sees fit in order to produce specific results.

In general, the system includes a plurality of transformers each having a primary winding and a secondary winding where the secondary windings are connected in series, a battery, a plurality of switches, each coupled to one of the plurality of transformers, the switches intermittently closes to complete a circuit between the battery and the primary winding of the one transformer and a processor that individually activates the respective switches of the plurality of transformers in a predetermined order to generate an alternating current voltage across an output of the series connected secondary windings.

Alternatively, the system includes a plurality of transformers each having a primary winding and a secondary winding where the secondary windings are connected in series, a battery, a respective switch coupled between the battery and each one of the plurality of transformers that intermittently closes to complete a circuit between the battery and the primary winding of the transformer and a processor that sequentially activates the plurality of switches in a predetermined order to generate an alternating current voltage across an output of the series connected secondary windings.

Alternatively, the system includes a plurality of transformers with a secondary winding of each of the plurality of transformers connected in series, a battery, a plurality of switches with each switch of the plurality directly coupled between the battery and a respective primary winding of one of the plurality of transformers, each of the plurality of switches intermittently closes at different times to complete a circuit between the battery and the primary winding of the respective transformer and a processor that sequentially activates the plurality of switches in a predetermined order to generate an alternating current voltage across an output of the series connected secondary windings.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
   a plurality of transformers each having a primary winding and a secondary winding where the secondary windings are connected in series; a battery;
   a plurality of switches, each coupled to one of the plurality of transformers, each switch intermittently closes to complete a circuit between the battery and the primary winding of each transformer; and
   a processor that individually activates the respective switches of the plurality of transformers in a predetermined order to generate an alternating current voltage across an output of the series connected secondary windings; and
   a precess processor configured to rotate the predetermined order after every half cycle, such that a first switch activated in a first repeating operational slot during a first half cycle is rotated to activate in a second repeating operational time slot during a second half cycle, and a second switch activated in the second repeating operational slot during the first half cycle is rotated to activate in a third repeating operational time slot during the second half cycle.

2. The apparatus as in claim 1 wherein each of the plurality of switches further comprises a first set of current control devices that cause current flow through the associated primary winding in a first direction during a first time period.

3. The apparatus as in claim 2 wherein each of the plurality of switches further comprises a second set of current control devices that cause current flow through the associated primary winding in a second direction that is opposite the first direction during a second time period.

4. The apparatus as in claim 1 wherein the plurality of switches further comprises four switches.

5. The apparatus as in claim 1 wherein the predetermined order further comprises a program embodied in memory that activates the plurality of switches in sequence.

6. The apparatus as in claim 1 wherein the predetermined order further comprises a program embodied in memory that changes the sequence of activation of the switches from one cycle of output voltage to the next.

7. An apparatus comprising:
   a plurality of transformers each having a primary winding and a secondary winding where the secondary windings are connected in series;
   a battery;
   a plurality of switches each coupled between the battery and each one of the plurality of transformers, each switch intermittently closes to complete a circuit between the battery and the primary winding of each transformer;
   a processor that sequentially activates the plurality of switches in a predetermined order to generate an alternating current voltage across an output of the series connected secondary windings; and
   a precess processor configured to rotate the predetermined order after every half cycle, such that a first switch activated in a first repeating operational slot during a first half cycle is rotated to activate in a second repeating operational time slot during a second half cycle, and a second switch activated in the second repeating operational slot during the first half cycle is rotated to activate in a third repeating operational time slot during the second half cycle.

8. The apparatus as in claim 7 further comprising a timing processor that repeats the sequential activation of the plurality of switches at a predetermined time interval.

9. The apparatus as in claim 7 further comprising a program saved in memory that repeats the sequential activation of the plurality of switches at a predetermined time interval.

10. The apparatus as in claim 7 further comprising a processor that alters the sequential activation of the plurality of switches after each cycle of activation of the plurality of switches to equalize a load across the plurality of switches and associated transformers.

11. The apparatus as in claim 10 further comprising a processor that advances a time of activation for each of the plurality of switches within the sequential activation of the plurality of switches after each cycle of activation of the plurality of switches.

12. The apparatus as in claim 11 wherein the activation sequence further comprises a plurality of repeating operational slots.

13. The apparatus as in claim 12 wherein a cycle of activation further comprises 360 electrical degrees and where each of the plurality of repeating operational slots is assigned an activation and deactivation time defined in electrical degrees.

14. The apparatus as in claim 13 wherein the advancing of the location of activation further comprises advancing a first switch from a first repeating operational slot of the plurality of repeating operational slots to a second repeating operational slot, a second switch from the second slot to a third slot and advancing a last switch from a last slot to the first slot.

15. An apparatus comprising:
   a plurality of transformers with a secondary winding of each of the plurality of transformers connected in series;
   a battery;
   a plurality of switches with each switch of the plurality directly coupled between the battery and a respective primary winding of one of the plurality of transformers, each of the plurality of switches intermittently closes at different times to complete a circuit between the battery and the primary winding of the respective transformer;
   a processor that sequentially activates the plurality of switches in a predetermined order to generate an alternating current voltage across an output of the series connected secondary windings; and
   a precess processor configured to rotate the predetermined order after every half cycle, such that a first switch activated in a first repeating operational slot during a first half cycle is rotated to activate in a second repeating operational time slot during a second half cycle, and a second switch activated in the second repeating operational slot during the first half cycle is rotated to activate in a third repeating operational time slot during the second half cycle.

16. The apparatus as in claim 15 further comprising a plurality of repeating operational slots that defines a time of activation and deactivation of each of the plurality of switches.

17. The apparatus as in claim 16 wherein the plurality of repeating operational slots are at least partially overlapping.

18. The apparatus as in claim 15 further comprising an activation and deactivation time for each of the plurality of repeating operational slots saved in memory.

19. The apparatus as in claim 18 wherein a cycle of activation further comprises 360 electrical degrees, and wherein the activation and deactivation times are defined in terms of electrical degrees.

20. The apparatus as in claim 15 wherein the precess processor is further configured to rotate the predetermined order after every half cycle, such that a third switch activated in the third repeating operational slot during a first half cycle is rotated to activate in a fourth repeating operational time slot during a second half cycle, and a fourth switch activated in the fourth repeating operational slot during the first half cycle is rotated to activate in the first repeating operational time slot during the second half cycle.

\* \* \* \* \*